Nov. 28, 1933.  L. BLACKMORE  1,936,659

AIR FILTER

Filed Sept. 16, 1927

Inventor
Lloyd Blackmore
By Blackmore, Spencer & Hulti
Attorneys

Patented Nov. 28, 1933

1,936,659

UNITED STATES PATENT OFFICE 1,936,659

AIR FILTER

Lloyd Blackmore, Highland Park, Mich., assignor to General Motors Corporation, Detroit, Mich., a corporation of Delaware Application September 16, 1927
Serial No. 219,971

3 Claims. (Cl. 183—51)

This invention relates to air filters and, particularly, to filters which are adapted to be used to clean the air supplied to the carburetors of internal combustion engines of automotive vehicles.

It is an object of this invention to provide a simple cloth filter through which the air current to the air intake must pass and which will cause the particles of dust to fall into a container which may be periodically removed and emptied. It is a further object of this invention to so construct and arrange the filter that it will not become clogged with oil thrown off from the engine and will not be in a position to annoy the operator. It is a still further object of the invention to provide such a filter which will be capable of adjustment for passing the incoming air past the exhaust pipe for heating during cold weather or directly into the air intake during warm weather.

Other objects of the invention will appear in the course of the following description, taken in connection with the accompanying drawing and appended claims.

Figure 1:
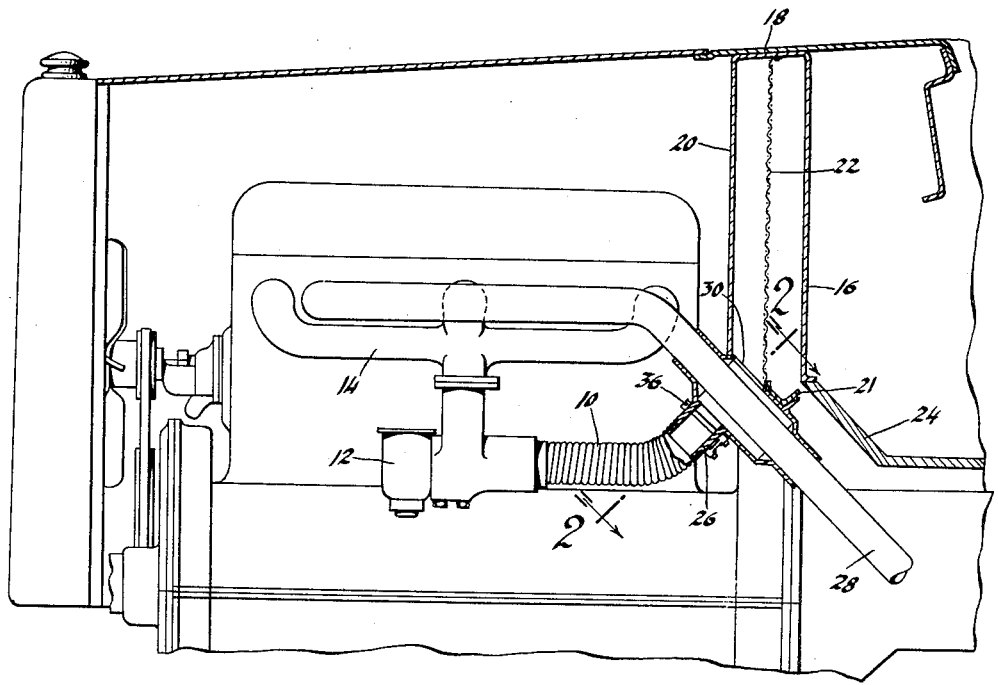
Figure 1 is a fragmentary view showing partly in section, and partly in side elevation, the front end of an automotive vehicle in which is embodied my invention.

In Figure 1 of the drawing, I have illustrated a portion of an automotive vehicle in which is installed a conventional internal combustion engine on which there is provided a flexible tube 10 through which incoming air passes to the carburetor 12 and intake manifold 14. In the rear of the engine compartment is the dash 16 and fixed to the dash 16 and to the body at 18 is the front wall 20 of the filter casing. The casing may be considered as a substantially closed compartment having a front wall 20 and a rear wall 16, or as a rearwardly opening compartment having a front wall 20. The size of the casing depends on the requirements of the engine and ordinarily covers only part of the dash. Fixed within the casing between the wall 20 and the dash 16 is filter cloth 22, which is stretched across the casing and firmly fastened to the walls of the casing.

A pan or trough 21 is slidably mounted across the lower part of the casing, the trough being narrow enough so that space is provided for the entrance of air under the sloping floor board 24 of the car.

Figure 2:
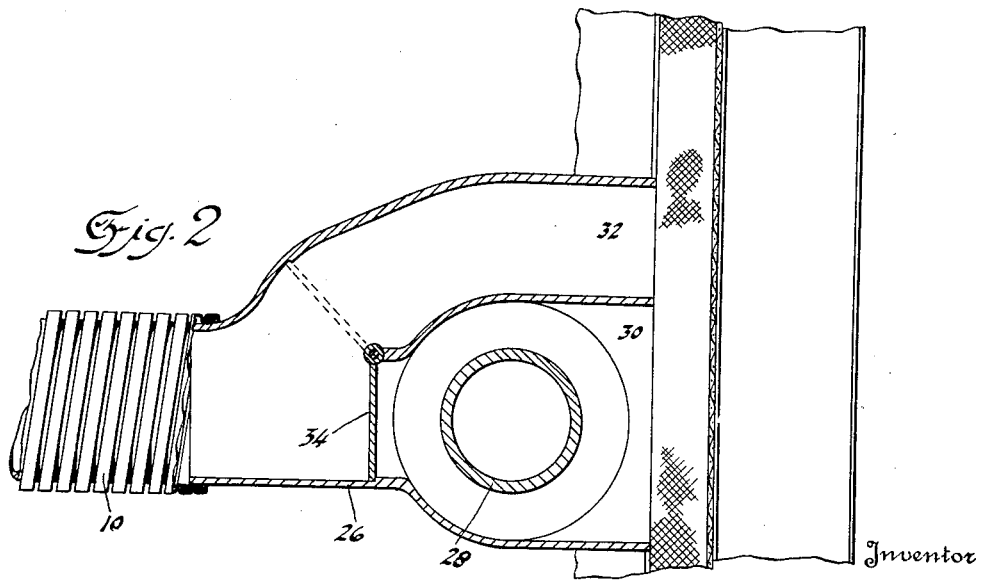
Figure 2 is an enlarged section taken on the line 2—2 of Figure 1.

In Figure 2, I have illustrated the bypass arrangement. The numeral 26 indicates a casing through which the exhaust pipe 28 extends. Openings 30 and 32 are provided leading into the filter casing ahead of the filter cloth. The lower front part of the casing converges and has connected therewith the rear end of the flexible tube 10. A valve 34 is pivotally mounted in the converging portion and is adapted to close one side of the casing so that air may enter through the opening 30 past the exhaust pipe or through the opening 32. I have provided the pivot bolt of the valve with a nut 36 so that the valve may be turned and fastened in any desired position.

In the operation of the device illustrated, air enters from below between the floor board 24 and trough 21 and passes through the cloth. Dust particles stopped by the cloth are shaken loose by the vibration and fall into the trough 21 which may be taken out occasionally and emptied. The large area of the cloth permits a slight vibration, and as the current through the cloth is not very rapid, due to the fact that its area is so much larger than a section of the air intake, this vibration is sufficient to shake the fine dust particles loose and permit them to fall into the trough.

I claim:

1. In an automotive vehicle including an internal combustion engine and a dash, means for cleaning air and for conducting the cleaned air to the engine including a casing forward of the dash and opening toward the dash, a conduit extending from the casing to the engine, a sheet of filtering material closing the opening in the casing and so mounted that it is adapted to flex during the operation of the cleaner so as to dislodge therefrom particles of foreign matter removed from the air thereby, and a removable receptacle between the sheet of filtering material and the dash in position to catch the foreign matter dislodged from the sheet.

2. In an automotive vehicle including an internal combustion engine and a dash, means for cleaning air and for conducting the cleaned air to the engine, including a casing forward of the dash and opening toward the dash, a sheet of filtering material over the open side of the casing, a conduit extending from the engine and having two branches communicating with the casing, means to heat the air passing through one of said branches, and a valve adapted to close either of the branches to communication with the engine.

3. In an air filter a casing, a substantially vertically disposed sheet of filter cloth forming a partition within the casing, an opening in the lower wall of the casing on one side of the sheet of filtering material, and a member arranged to function as a closure for a portion of the opening and as a receptacle for collecting the dirt dislodged from the sheet of filtering material.

LLOYD BLACKMORE.